(12) United States Patent
Ishiguro (10) Patent No.: US 7,683,935 B2
(45) Date of Patent: Mar. 23, 2010

(54) IMAGING DEVICE

(75) Inventor: Takashi Ishiguro, Tokyo (JP)

(73) Assignee: Olympus Corporation, Tokyo (JP)

( * ) Notice: Subject to any disclaimer, the term of this patent is extended or adjusted under 35 U.S.C. 154(b) by 741 days.

(21) Appl. No.: 11/462,220

(22) Filed: Aug. 3, 2006

(65) Prior Publication Data

US 2007/0030377 A1 Feb. 8, 2007

(30) Foreign Application Priority Data

Aug. 8, 2005 (JP) .............................. 2005-229215

(51) Int. Cl.
*H04N 5/228* (2006.01)
*H04N 5/225* (2006.01)
(52) U.S. Cl. .................... 348/208.4; 348/340
(58) Field of Classification Search ............ 348/208.4, 348/218.1, 229.1, 240.99, 241, 264, 302, 348/307, 308, 335, 373, 340
See application file for complete search history.

(56) References Cited

U.S. PATENT DOCUMENTS 5,905,530 A * 5/1999 Yokota et al. .......... 348/240.99
6,809,760 B1 * 10/2004 Takagi et al. ............. 348/211.9
2005/0068444 A1 * 3/2005 Oshima et al. ............. 348/335
2006/0056056 A1 * 3/2006 Ahiska et al. ............. 359/690

FOREIGN PATENT DOCUMENTS

JP 10-233950 A 9/1998

\* cited by examiner

*Primary Examiner*—Lin Ye
*Assistant Examiner*—Akshay Trehan
(74) *Attorney, Agent, or Firm*—Westerman, Hattori, Daniels & Adrian, LLP

(57) ABSTRACT

The invention relates to an imaging device. An imaging device includes an image sensor for producing an image data related an object image; an optical system for forming on the image sensor the object image in which a predetermined region having as center a position that is different from a center position of the image sensor is expanded and a peripheral region thereof is compressed with distortion; and a distortion correction circuit for correcting the compressed distortion with respect to image data related to the object image from the image sensor.

6 Claims, 10 Drawing Sheets

THIS IS A CASE IN WHICH
THE OBJECT IN A CIRCLE
IS EXPECTED TO BE ZOOMED IN.

GREATEST CHANGE OF BRILLIANCE

FIG. 11

GREATEST MOTION VECTOR

IMAGING DEVICE

PRIORITY CLAIM

Priority is claimed on Japanese Patent Application No. 2005-229215, filed with the Japanese Patent Office on Aug. 8, 2005, the content of which is incorporated herein by reference.

BACKGROUND OF THE INVENTION

1. Field of the Invention

The invention relates to an imaging device, and particularly to an imaging device that simultaneously obtains a plurality of angles of view such as a wide angle image and a telescopic image.

2. Description of the Related Art

Zoom functions in an image input device such as a video camera, a digital camera or a monitoring camera have been widely used these days, by which a change of the focal distance of a lens or scale-up or scale-down of an image is easily performed, according to a distance to or a size of an angle of view toward an object to be shot. The zoom functions can be classified into an optical zoom function and an electronic zoom function. The optical zoom function can be realized by mechanically moving a lens inside. On the other hand, the electronic zoom function may make use of part of an image output from an imager to generate an image by complementing a new pixel among pixels and magnify it. The electronic zoom function has an advantage that it may be realized as compact without a driving portion and at a low cost, compared with the optical zoom function. However, it has a problem that it is inferior in image quality.

Figure 14:
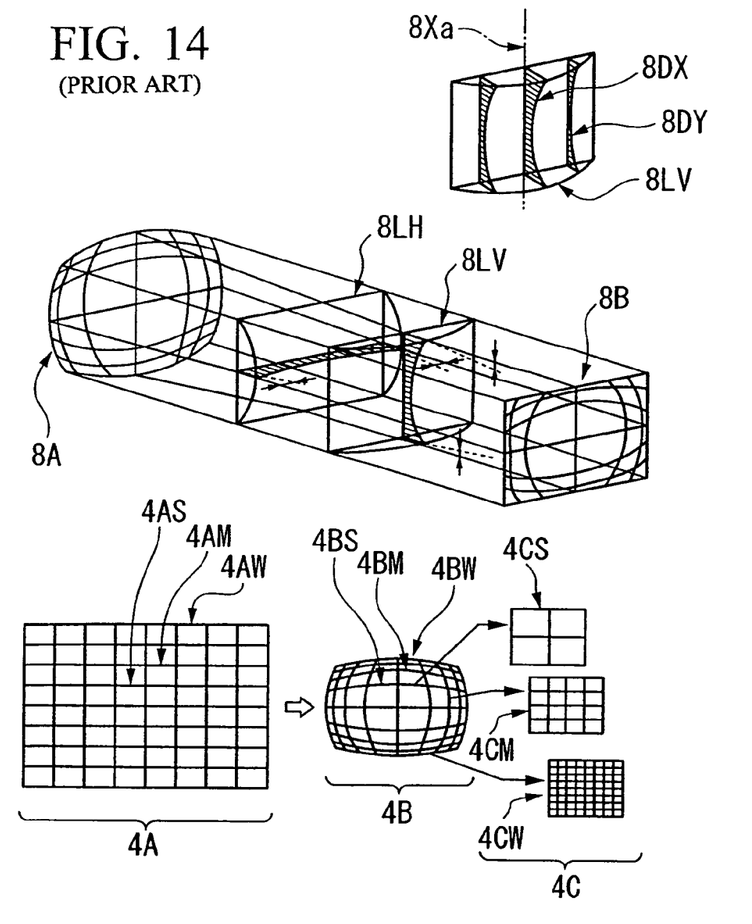
FIG. 14 shows a construction of an electronic zoom image input system of prior art.

In order to solve the problem, there is proposed an electronic zoom image input system as shown in FIG. 14, which includes an image input optical unit with a fixed focal distance for compressing a circumferential part of an input image, a photo detector with a uniform density of pixels for receiving the image through the system, and a unit for complementing and correcting the image received by the photo detector having distortion caused by the compression. The image input system is characteristic of obtaining a zoomed image of an equivalent resolution in the operating region. See, for example, Japanese Patent Publication Hei 10-233950. The system is expected to produce an image having less deterioration in the middle of both a wide angle image and a telescopic image, regardless of unavoidable deterioration in a peripheral part thereof.

Figure 16:
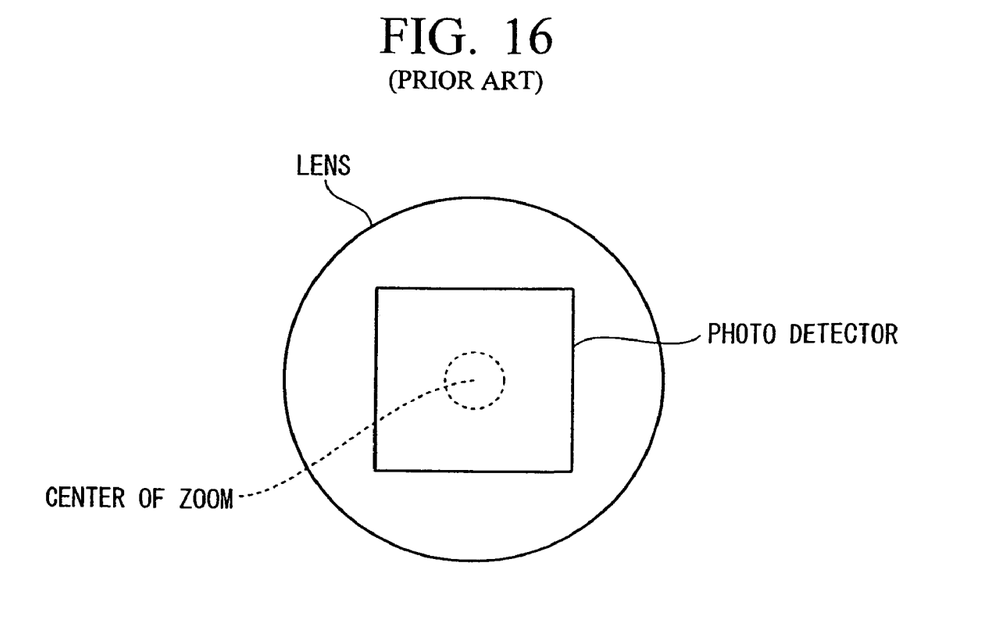
FIG. 16 is a diagram for showing a positional relationship between a lens and a photo detector in the prior art.
Figure 17:
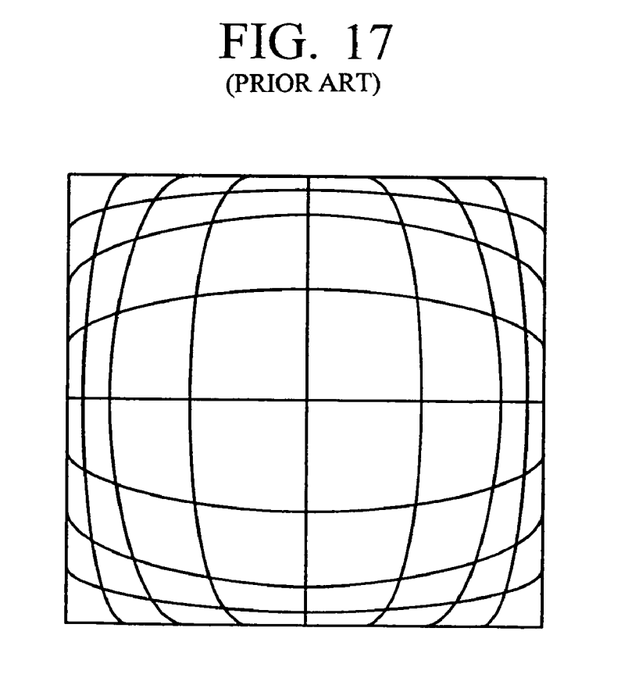
FIG. 17 shows captured image data when the positional relationship between the lens and the photo detector is shown in FIG. 16.

The image input system of the prior art described above has a structure as shown in FIG. 16, in which a zoom center position of a lens agrees with a center position of an imager. The zoom center position is defined by a position in which the lens can form the most magnified optical image. Under the situation, the optical image incident on the photo detector, as shown in FIG. 17, the central portion is expanded and the circumferential portion is compressed. As a result of this, since the image contains more pixel information in the central portion, image processing can produce a fine, zoomed image for the central portion. By contrast, because the image has less pixel information in the circumferential portion, a fine, zoomed image therefore cannot be obtained. This is a problem.

Figure 15:
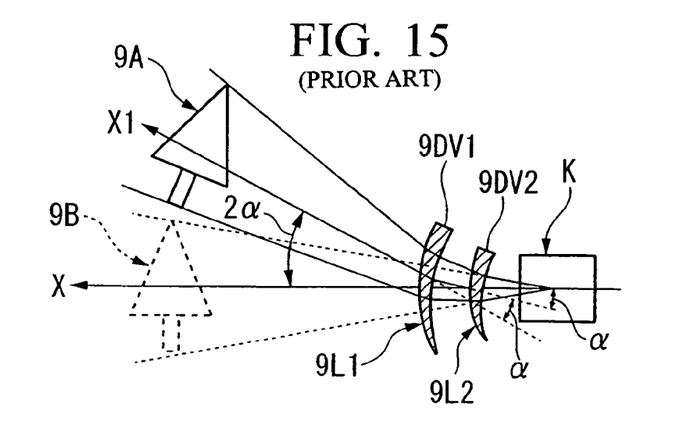
FIG. 15 shows a construction of the electronic zoom image input system of the prior art.

Under the situation, when there is no object in the middle, the prior art described above, as shown in FIG. 15, discloses that two cuneate prism lenses are inserted, each being rotated independently.

SUMMARY OF THE INVENTION

The invention provides an imaging device having the following structure.

The imaging device of the invention comprises an image sensor for producing an image data related an object image; an optical system, for forming on the image sensor the object image in which a predetermined region having as center a position that is different from a center position of the image sensor is expanded and a peripheral region thereof is compressed with distortion; and a distortion correction circuit for correcting the compressed distortion with respect to image data related to the object image from the image sensor.

Preferably, the imaging device finer comprises a position changing unit for changing a position of the predetermined region with respect to the image sensor.

Preferably, the position changing unit includes a changing information input section for inputting changing information related to the change of the position; a movement value calculator for calculating a movement value of the optical system based on the input changing information; and a driver for moving the position of the predetermined region based on the calculated movement quantity.

Advantageously, the position changing unit includes a frame memory for storing a reference image; an object position detector for detecting a position of an object of interest based on the reference image and an image subsequent to the reference image; a movement value calculator for calculating a movement value of the optical system based on the position of the object; and a driver for moving the optical system based on the calculated movement value.

Advantageously, the object position detector detects the position of the object of interest based on at least one differential of color or luminance between the reference image and the subsequent image.

Advantageously, the object position detector detects the position of the object of interest based on the motion vector between the reference image and the subsequent image.

Advantageously, the position changing unit includes a rotation speed input section for inputting a rotation speed; and a rotator for rotating the position of the predetermined region according to the rotation speed.

DETAILED DESCRIPTION OF THE INVENTION

The imaging device in accordance with the embodiments of the invention will be described below in detail with reference to FIGS. 1 to 13.

The imaging device in accordance with a first embodiment of the invention is directed to a monitoring camera system.

Figure 1:
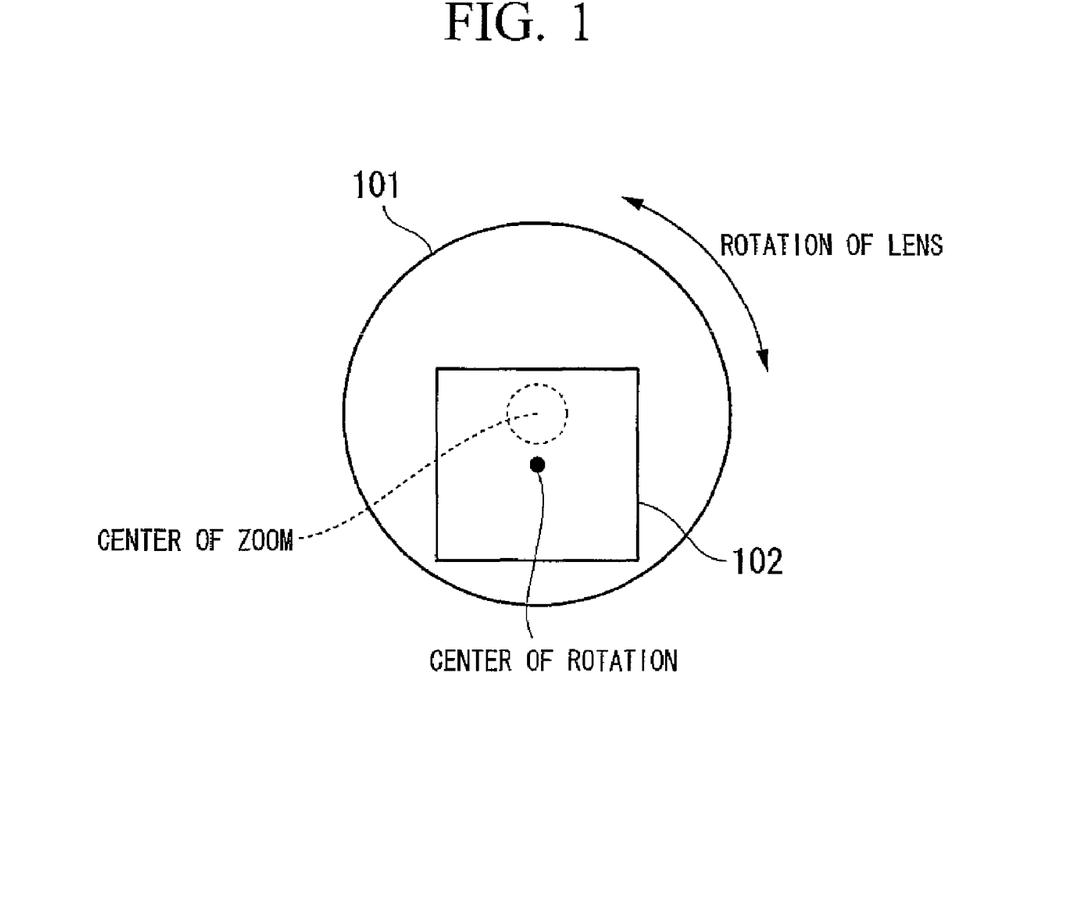
FIG. 1 is a diagram for showing a positional relationship between a lens and a photo detector in accordance with the invention.

FIG. 1 is a diagram for showing a positional relationship between a lens 101 and a photo detector 102 in accordance with the invention. In FIG. 1, the lens 101 is one that has the optical aberration characteristics, through which an image around the center of a zoom is magnified and an image around the periphery thereof is compressed. The photo detector 102 is eccentrically placed so that a zoom center position for the lens 101 disagrees with or deviates from a center position for the photo detector 102. The lens 101 is rotated about the center position for the photo detector 102.

Figure 2:
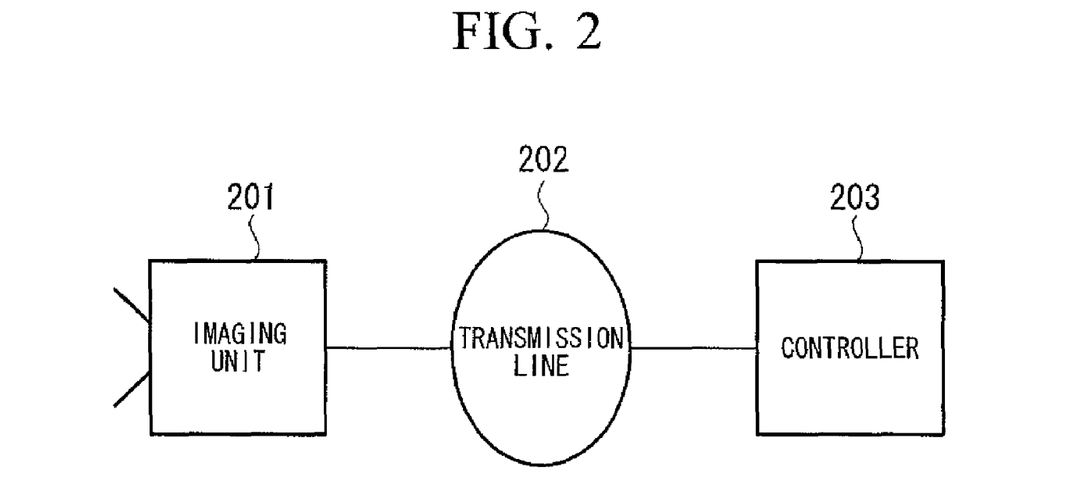
FIG. 2 is a diagram for showing a construction of a monitoring camera system in accordance with a first embodiment of the invention.

FIG. 2 is a diagram for showing a construction of a monitoring camera system in accordance with a first embodiment of the invention. The monitoring camera system, as shown in FIG. 2, includes an imaging unit 201, a transmission line 202, and a controller 203. An image obtained by the imaging unit 201 in the system is transferred through the transmission line 202 to the controller 203, where the image is displayed and stored. When some operation is applied to the controller 203, information corresponding to the operation is conveyed to the imaging unit 201 by way of the transmission line 202. The transmission line 202 can be realized by either being wired or wireless.

Figure 3:
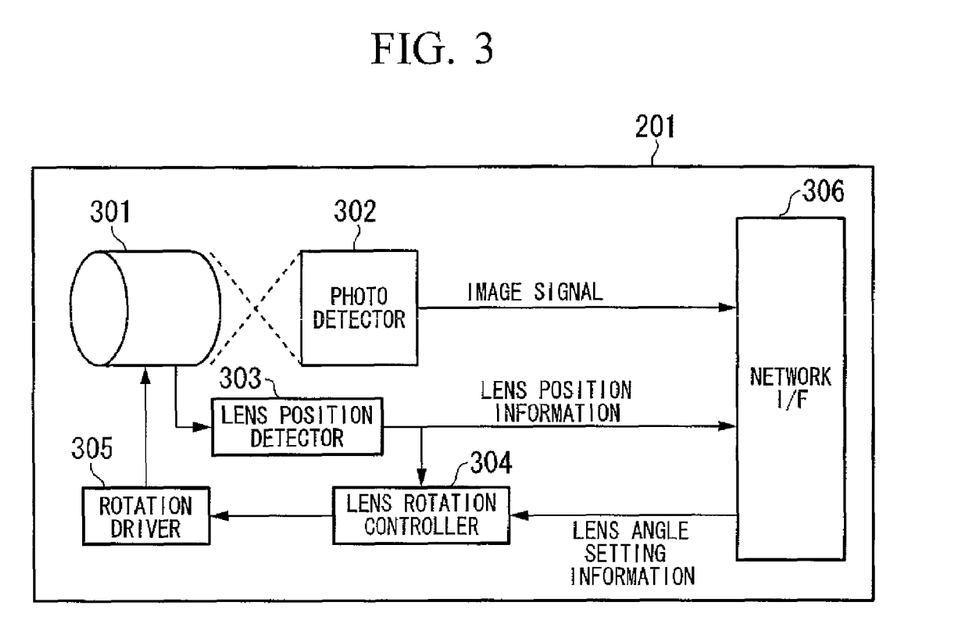
FIG. 3 is a block diagram for showing a construction of an imaging unit in the monitoring camera system in accordance with the first embodiment.

FIG. 3 is a block diagram for showing a construction of the imaging unit 201 in the monitoring camera system in accordance with the first embodiment. The imaging unit 201, as shown in FIG. 3, contains a lens (corresponding to an optical system) 301, a photo detector (also called an image sensor) 302, a lens position detector 303, a lens rotation controller 304, a rotation driver (also called a driver) 305, and a network 306. The photo detector 302 may be constructed by, for example, a CMOS sensor or a CCD sensor.

The lens 301 and the photo detector 302 are placed, as in FIG. 1, so that a zoom center position for the lens 301 disagrees with a center position for the photo detector 302. The lens 301 is rotated about the center position for the photo detector 302.

Figure 4:
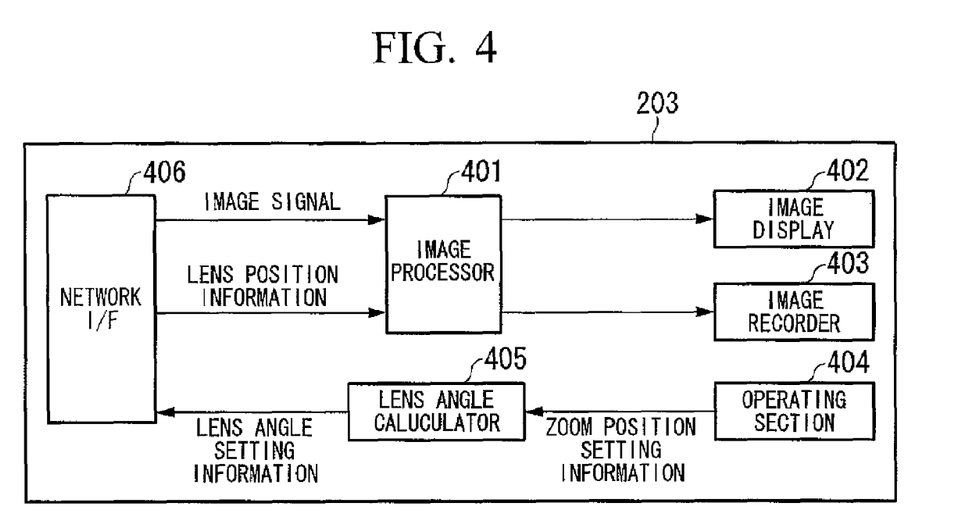
FIG. 4 is a block diagram for showing a construction of a controller in the monitoring camera system in accordance with the first embodiment.

FIG. 4 is a block diagram for showing a construction of the controller 203 in the monitoring camera system in accordance with the first embodiment. The controller 203, as shown in FIG. 4, includes an image processor (also called a distortion correction circuit) 401, an image display 402, an image recorder 403, an operating section (also called a modification information input section) 404, a lens angle calculator (also called a movement quantity calculator) 405, and a network I/F 406.

An operation of each structural element of the imaging unit 201 in the first embodiment will be explained next.

An optical image derived through the lens 301 is incident upon the photo detector 302, where the optical image is converted to an electrical signal. The electrical signal is supplied to the network I/F 306, from which the electrical signal is output externally The lens position detector detects a relative position of a rotational direction of the lens 301 relative to the photo detector 302, which is finished to the network I/F 306 to be output externally as lens position information.

The lens rotation controller 304 controls rotations of the rotation driver 305, based on lens angle setting information from the network I/F 306 and lens position information from the lens position detector 303 so that the lens 301 is positioned at an angle designated by the lens angle calculator 405. The rotation driver 305 rotates the lens 301 in the direction shown in FIG. 1 in response to the lens rotation controller 304 to vary a relative position in the rotational direction of the lens 301 and the photo detector 302.

An effect caused by changing a relative position in the rotational direction of the photo detector 302 through the rotation of the lens 301 will be explained referring to FIGS. 5-8.

Figure 5:
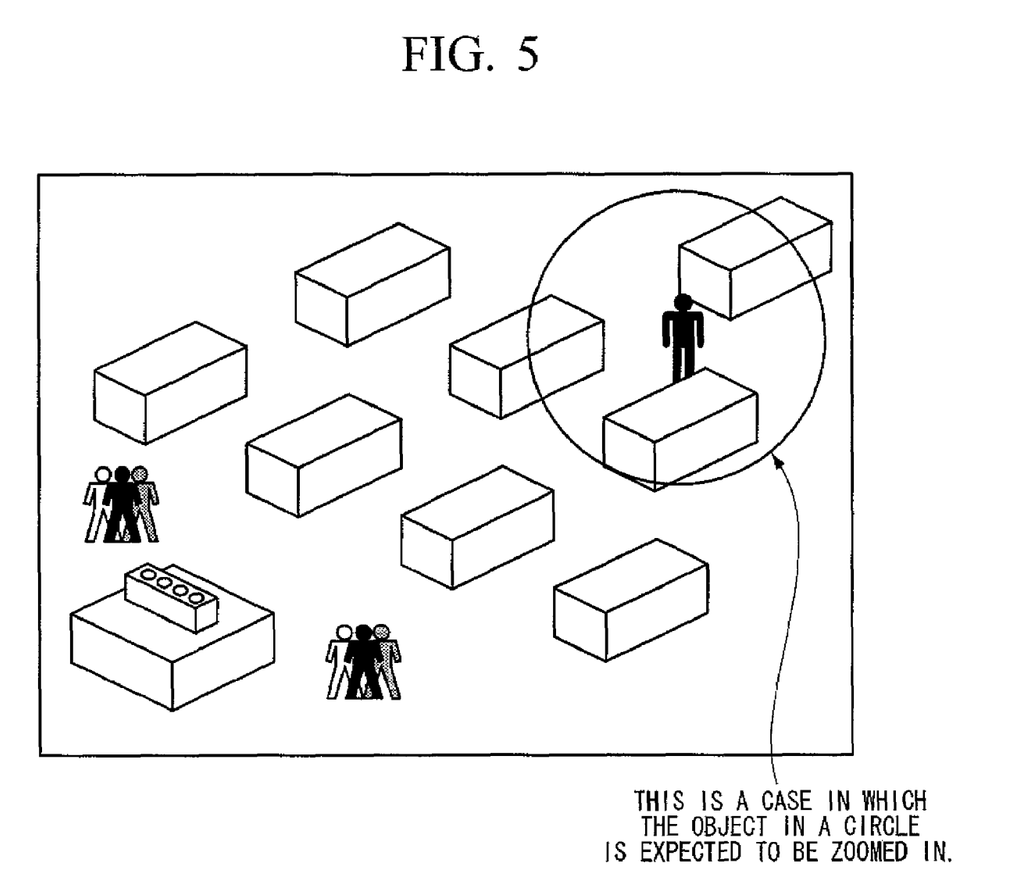
FIG. 5 shows a case in which a main object is in a right upper portion.
Figure 6A:
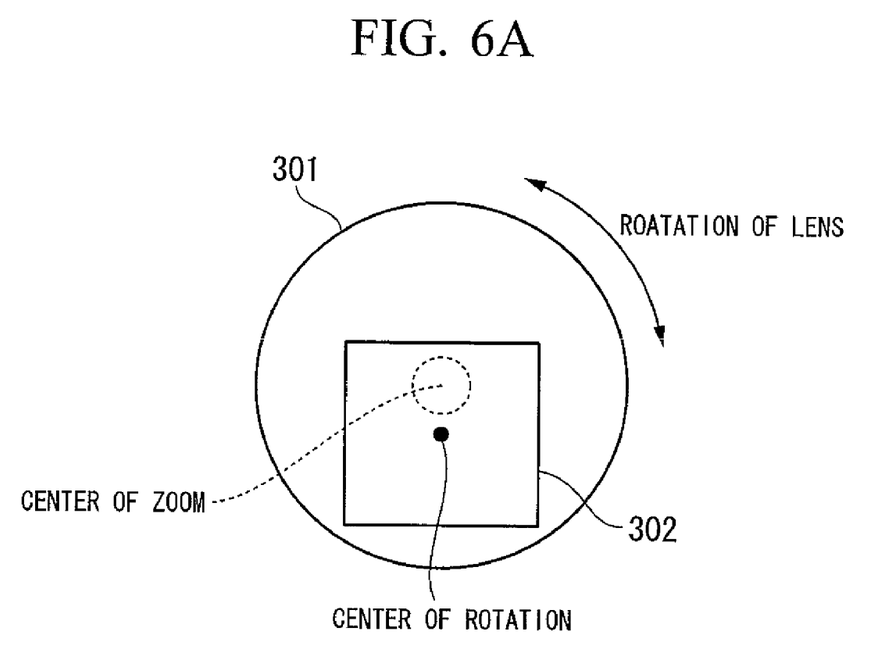
FIG. 6A is a diagram for showing a positional relationship between a lens and a photo detector before the lens is rotated.
Figure 6B:
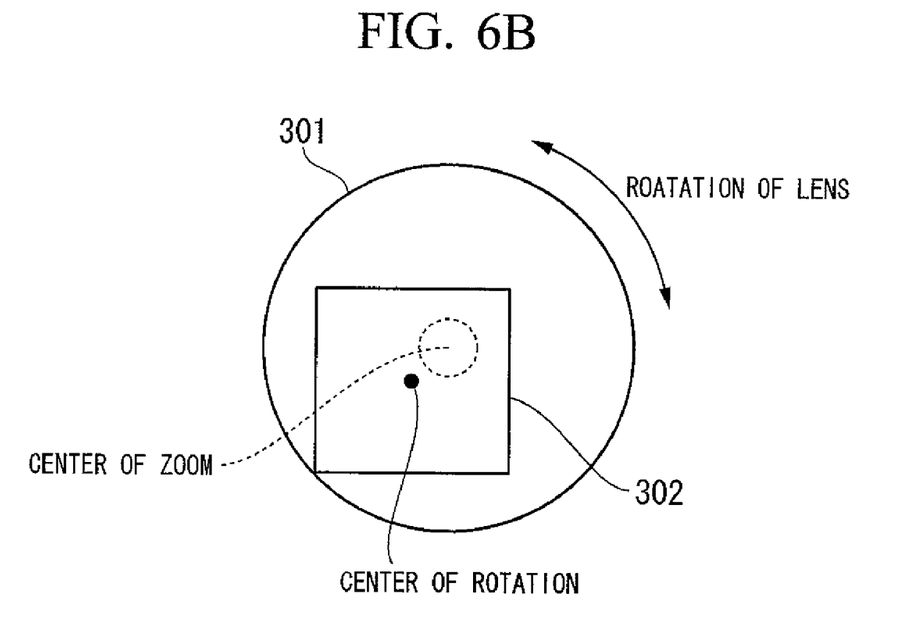
FIG. 6B is a diagram for showing a positional relationship between the lens and the photo detector after the lens has been rotated.
Figure 7A:
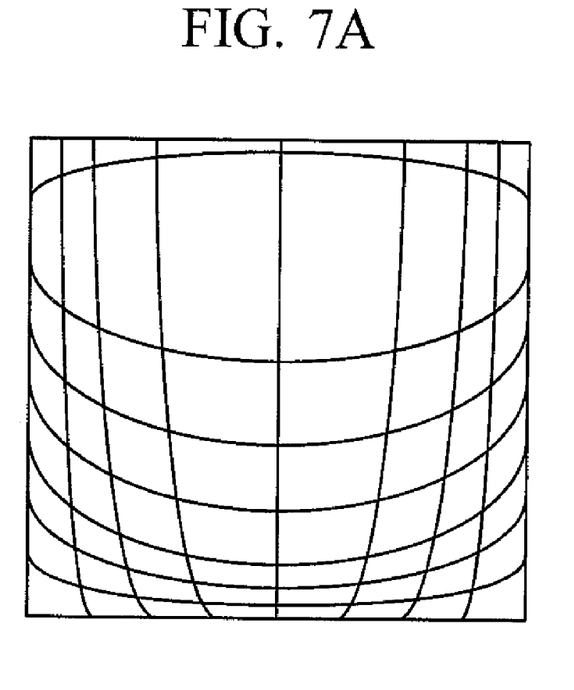
FIG. 7A shown an image obtained when the positional relationship between the lens and the photo detector is shown in FIG. 6A.
Figure 7B:
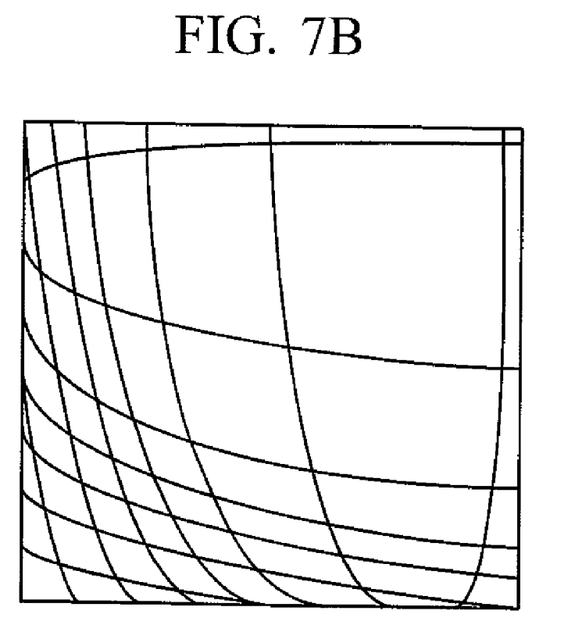
FIG. 7B shown captured image data when the positional relationship between the lens and the photo detector is shown in FIG. 6B.
Figure 8:
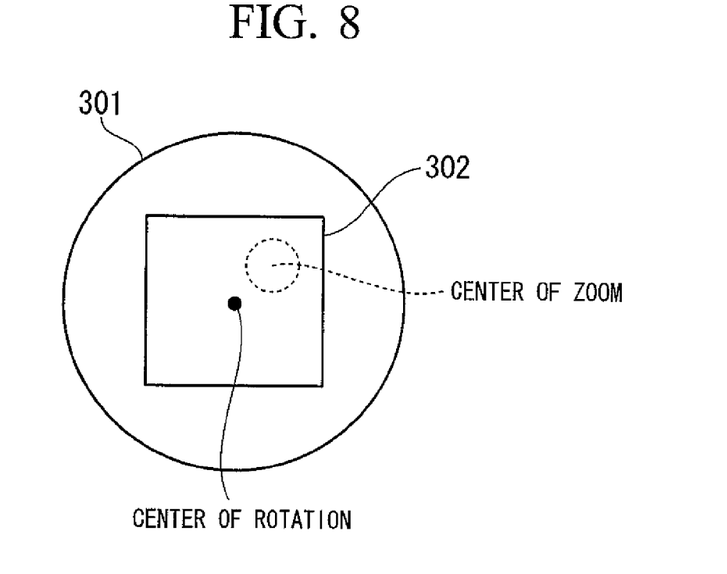
FIG. 8 is a diagram for showing a variation of the positional relationship between the lens and the photo detector.

FIG. 5 shows a case in which a main object is in a right upper portion. FIG. 6A is a diagram for showing a positional relationship between a lens and a photo detector before the lens is rotated; FIG. 6B is a diagram for showing a positional relationship between the lens and the photo detector after the lens has been rotated. FIG. 7A shown captured image data when the positional relationship between the lens and the photo detector is shown in FIG. 6A; FIG. 7B shown captured image data when the positional relationship between the lens and the photo detector is shown in FIG. 6B. FIG. 8 is a diagram for showing a variation of the positional relationship between the lens and the photo detector.

The zoom center position of the lens 301 disagrees with the central position of the photo detector 302 with respect to the invention. For example, when the lens 301 and the photo detector 302 are placed as shown in FIG. 6A, an optical image incident on the photo detector 302 is shown in FIG. 7A, in which the upper portion of the image plane can be derived with higher resolution.

Where a main object is present in the right upper portion as shown in FIG. 5, for example, the lens 301 may be rotated about the center position of the photo detector 302 as shown in FIG. 6B, which moves the zoom center to the right upper portion of the image plane. This produces an optical image incident upon the photo detector 302 that is shown in FIG. 7B. Because the produced optical image has higher resolution in the right upper portion of the image plane, image processing can generate a zoom image having higher resolution in the right upper portion of the image plane.

As described above, a zoom image for a peripheral portion can be obtained, because the zoom center position of the lens 301 is placed to disagree with the central position of the photo detector 302 and the lens 301 is rotated about the central position of the photo detector 302. It is assumed in the embodiment that the lens 301, whose zoom central position is in the middle thereof, is placed to disagree with the central position of the photo detector 302. However, as shown in FIG. 8, it is of course possible to use a lens whose zoom central position is originally away from the center of the lens.

An operation of each structural element in the controller 203 in accordance with the first embodiment will be described.

The image processor 401 seeks a zoom central position in an image plane based on the lens position information from the network I/F 406. Based on this, an image signal from the network I/F 406 undergoes distortion correction processing in the image processor 401 to be displayed on the image display 402 at a desired zoom magnification.

The lens position information and the image signal before the distortion correction processing are stored in a storing medium in the image recorder 403. The operating section 404 outputs zoom position setting information designated by an operator to the lens angle calculator 405, which calculates how much the lens should be rotated in order to match the zoom central position of the lens to a designated zoom position and outputs the calculated result to the network I/F 406 as lens angle setting information.

The network I/F 406 can be connected to the network I/F 306. The image signal and lens position information from the network I/F 406 are the same as those that are applied to the network I/F 306, respectively.

As described above, the controller 203 sets the lens rotation angle to move the central position of the lens 301 at the designated zoom position. The imaging unit 201 rotates the lens 301 based on the set angle and shoots the designated position with higher resolution. Accordingly, the operator can obtain a zoomed image at an arbitrary position within a movable range by the rotation of the lens 301.

The overall system and the structure of the imaging unit of a second embodiment are identical to those of the first embodiment. Therefore, the identical portion will not be described.

Figure 9:
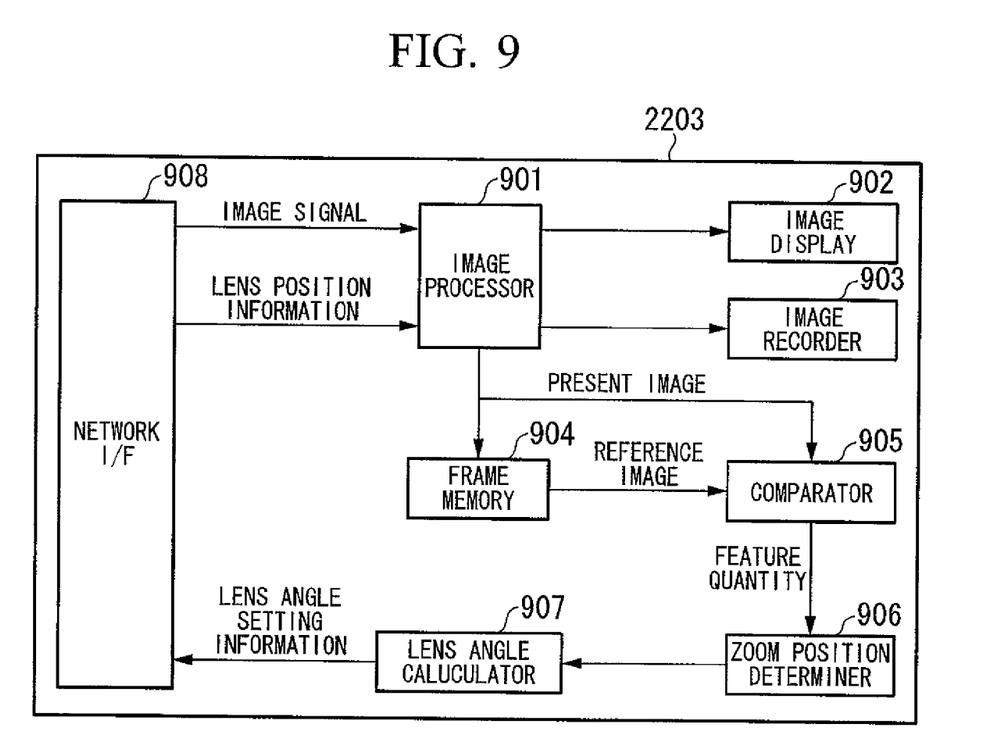
FIG. 9 is a block diagram for showing a construction of a controller in a monitoring camera system in accordance with a second embodiment.

FIG. 9 is a block diagram for showing a construction of a controller in a monitoring camera system in accordance with a second embodiment. The controller 2203 in accordance with a second embodiment, as shown in FIG. 9, contains an image processor 901, an image display 902, a frame memory 904, a comparator 905, a zoom position determiner (also called an object detector) 906, a lens angle calculator (also called a movement calculator) 907, and a network I/F 908.

An operation of each structural element in the controller 2203 in accordance with the second embodiment will be described.

An image signal from the network I/F 908 is applied to the image processor 901, where a zoom central position in an image plane is sought based on lens position information from the network I/F 908. The image signal receives distortion correction processing based on the zoom central position to be displayed at a desired zoom magnification on the image display 902.

The image signal and the lens position information are stored in a storing medium in the image recorder 903. The frame memory 904 stores a past image as a reference image. The comparator 905 compares a present image with the reference image to extract a feature value variation from the two images. The zoom position determiner 906 determines the position of a main object, that is, the zoom position, based on the feature value derived from the comparator 905. The lens angle calculator 907 calculates a lens rotation angle necessary for moving the zoom center of the lens 301 to the zoom position and outputs the calculated angle as lens angle setting information to the network I/F 908.

Figure 10:
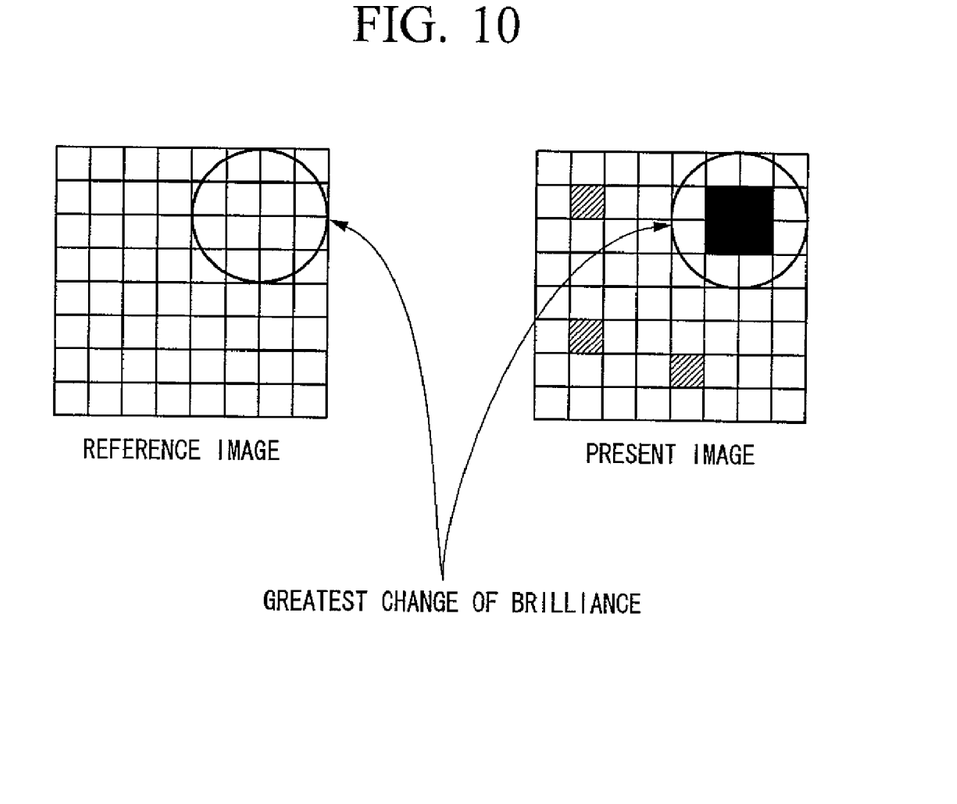
FIG. 10 is a diagram for explaining how a main object is detected according to a change of brilliance.

FIG. 10 is a diagram for explaining how a main object is detected according to a change of brilliance. The method of using a change of brilliance in the comparator 905 will be discussed as an example of extracting, referring to FIG. 10.

An image of the monitoring camera does not change when nothing extraordinary happens. However, when the image has changed, there is a strong possibility that a main object is present there. Consequently, the position of the main object can be detected as follows as one example. A change of brilliance at the same position in an image plane, as shown in FIG. 10, is calculated between the reference image and the present image. A position having the largest absolute value of a change of brilliance is detected. Then, the portion having the largest change in the image plane, i.e., the position of the main object can be detected. The detection of a change of colors can detect the position of the main object instead of a change of brilliance.

Figure 11:
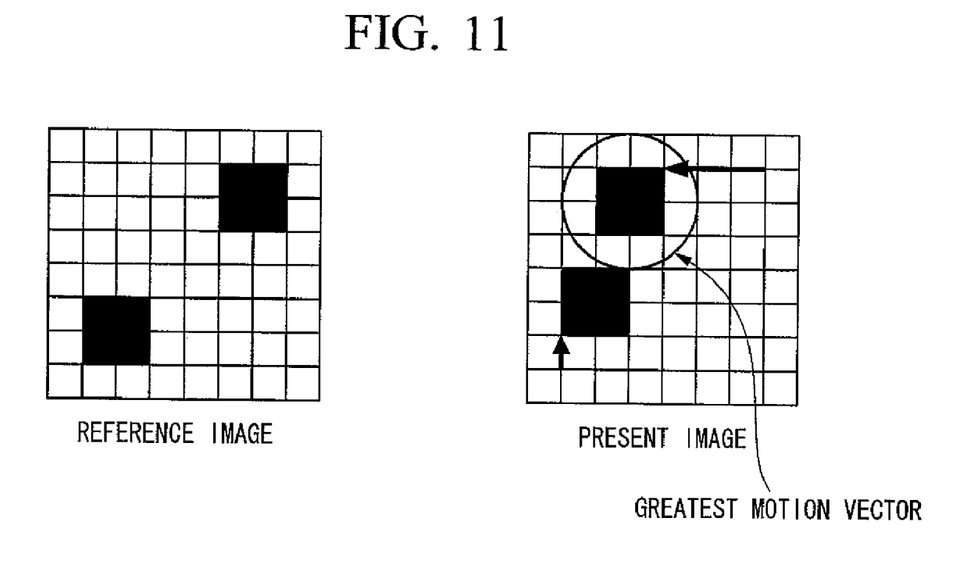
FIG. 11 is a diagram for explaining how a main object is detected according to a motion vector.

FIG. 11 is a diagram for explaining how a main object is detected according to a motion vector. The method of using a motion vector will be explained as another example of extracting the feature value, referring to FIG. 11.

According to this method, a motion vector is obtained by the so-called block matching process between the reference image and the present image, a position having the largest motion vector is detected, and then a portion having had the greatest movement in the image plane, that is, the position of the main object can be detected.

As explained above, in the controller 2203, the reference image and the present image are compared to obtain the feature quality, which detects the position of the main object automatically. Since the imaging unit 2201 shoots the position with higher resolution, the zoom center is automatically moved to the position of the main object in a movable range by a rotation of the lens 301. Accordingly, a zoom image of the main object can be obtained even if an operator is not available.

An overall system of a third embodiment is identical to that of the first embodiment. Therefore, the identical portion will not be described.

Figure 12:
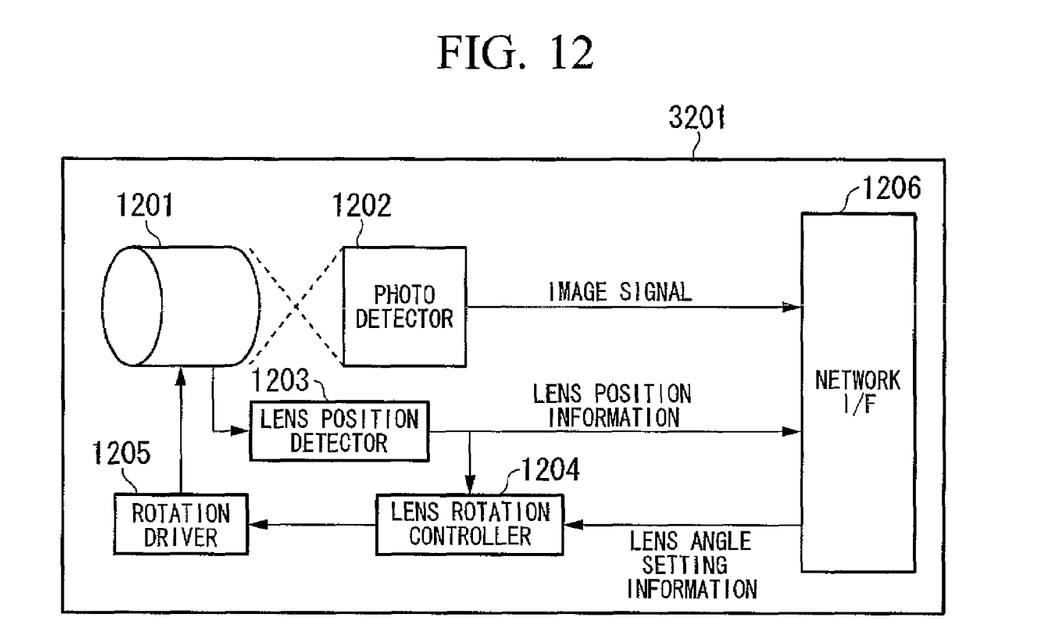
FIG. 12 is a block diagram for showing a construction of an imaging unit in a monitoring camera system in accordance with a third embodiment.

FIG. 12 is a block diagram for showing a construction of an imaging unit in a monitoring camera system in accordance with a third embodiment. An imaging unit 3201 in accordance with the third embodiment, as shown in FIG. 12, includes a lens 1201, a photo detector 1202, a lens position detector 1203, a lens rotation controller (also called a rotation unit) 1204, a rotation driver 1205, and a network I/F 1206.

The positional relationship between the lens 1201 and the photo detector 1202 is the same as that of the first embodiment. As shown in FIG. 1, the lens 1201 and the photo detector 1202 are eccentrically placed so that a zoom center position for the lens 1201 disagrees with a center position for the photo detector 1202. The lens 1201 is rotated about the center position for the photo detector 1202.

Figure 13:
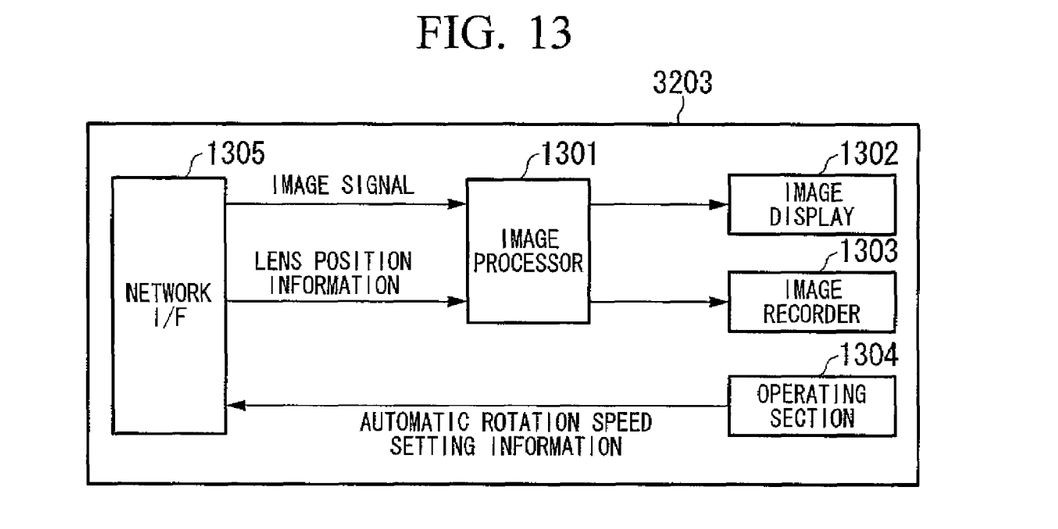
FIG. 13 is a block diagram for showing a construction of a controller in the monitoring camera system in accordance with the third embodiment.

FIG. 13 is a block diagram for showing a construction of a controller in the monitoring camera system in accordance with the third embodiment. The controller 3203 of the third embodiment, as shown in FIG. 13, includes an image processor 1301, an image display 1302, an image recorder 1303, an operating section (also called a rotation speed input section) 1304, and a network I/F 1305.

An operation of each structural element of the imaging unit 3201 in the third embodiment will be explained next.

An optical image derived through the lens 1201 is incident upon the photo detector 1202, where the optical image is converted to an electrical signal. The electrical signal is supplied to the network I/F 1206, from which the electrical signal is output externally. The lens position detector detects a relative position of a rotational direction of the lens 1201 relative to the photo detector 1202, which is finished to the network I/F 1206 to be output externally as lens position information.

The lens rotation controller 1204 controls rotations of the rotation driver 1205, based on automatic rotation speed setting information from the network I/F 1206 and lens position information from the lens position detector 1203 so that the lens 1201 is rotated at a speed designated. The rotation driver 1205 rotates the lens 1201 at a constant speed, as shown in FIG. 1, in response to the lens rotation controller 1204.

An operation of each structural element of the controller 3203 in accordance with the third embodiment will be described.

The image processor 1301 seeks the zoom central position in an image plane based on the lens position information from the network I/F 1305. Based on this, an image signal from the network I/F 1305 undergoes distortion correction processing to be displayed on the image display 1302 at a desired zoom magnification.

The lens position information and the image signal before the distortion correction processing are stored in a storing medium in the image recorder 1303. The operating section 1304 outputs a rotation speed designated by an operator to the network I/F 1305 as automatic rotation speed setting information.

As described above, the controller 3203 sets the automatic rotation speed, while the imaging unit 3201 rotates the lens 1201 at the constant speed set and circulates the zoom center for shooting. Accordingly, when the operator sets a rotation speed once, zoom images at a plurality of positions within a movable range by the rotation of the lens can be continuously obtained.

The embodiments in accordance with the invention will be described in detail referring to the figures. However, the invention is not limited to the specific structure of these embodiments and includes design change within the scope of its gist. For example, the embodiments in accordance with the invention employ the structure in which the zoom center position of the lens and the center position of the photo detector are arranged eccentrically, so that rotating the lens about the center position of the photo detector produces zoom images in the peripheral portion. The lens may be moved in the X direction and/or Y direction on the plane coordinates so that zoom images in the peripheral portion are derived.

The invention has the advantage that the zoom position can be changed for shooting without changing a shooting angle.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An imaging device comprising:
an image sensor;
an optical system for expanding a predetermined region of the image sensor and compressing a peripheral region thereof, the optical system being capable of changing the position of the optical system relative to the image sensor by rotating the optical system around a center which corresponds to an axis that is different from an optical axis; and
a position changing unit for changing a position of the predetermined region with respect to the image sensor, wherein the position changing unit includes:
a frame memory for storing a reference image;
an object position detector for detecting a position of an object of interest based on the reference image and an image subsequent to the reference image;
a movement value calculator for calculating a movement value of the optical system based on the position of the object; and
a driver for moving the optical system based on the calculated movement value.

2. An imaging device as recited in claim 1, wherein the object position detector detects the position of the object of interest based on at least one differential of color or luminance between the reference image and the subsequent image.

3. An imaging device as recited in claim 1, wherein the object position detector detects the position of the object of interest based on the motion vector between the reference image and the subsequent image.

4. An imaging device comprising:
an image sensor;
an optical system for expanding a predetermined region of the image sensor and compressing a peripheral region thereof, the optical system being capable of changing the position of the optical system relative to the image sensor by rotating the optical system around a center which corresponds to an axis that is different from an optical axis; and
a position changing unit for changing a position of the predetermined region with respect to the image sensor, wherein the position changing unit includes:
a changing information input section for inputting changing information related to the change of the position;
a movement value calculator for calculating a movement value of the optical system based on the input changing information; and
a driver for moving the position of the predetermined region based on the calculated movement quantity.

5. An imaging device as recited in claims 4 or 1, wherein the position changing unit includes:
a rotation speed input section for inputting a rotation speed; and
a rotator for rotating the position of the predetermined region according to the rotation speed.

6. An imaging device according to claims 4 or 1, further comprising a distortion correction circuit for correcting the compressed distortion with respect to image data related to the object image from the image sensor.

* * * * *